(12) United States Patent
Navarra Pruna

(10) Patent No.: US 6,755,386 B2
(45) Date of Patent: Jun. 29, 2004

(54) MARKER FOR PLASTIC PART FORMING MOULDS

(76) Inventor: Alberto Navarra Pruna, Calle Juan Ramon Jimenez no. 8, 08960 Sant Just Desvern, Barcelona (ES)

( * ) Notice: Subject to any disclaimer, the term of this patent is extended or adjusted under 35 U.S.C. 154(b) by 2 days.

(21) Appl. No.: 10/148,522
(22) PCT Filed: Feb. 8, 2001
(86) PCT No.: PCT/ES01/00034
§ 371 (c)(1), (2), (4) Date: May 31, 2002
(87) PCT Pub. No.: WO02/28616
PCT Pub. Date: Apr. 11, 2002

(65) Prior Publication Data
US 2002/0179810 A1 Dec. 5, 2002

(30) Foreign Application Priority Data
Oct. 5, 2000 (ES) .................................. 200002430 U

(51) Int. Cl.[7] .............................................. B29C 33/00
(52) U.S. Cl. ...................................... 249/103; 249/104
(58) Field of Search ................................ 249/103, 104, 249/140, 155; 425/190, 195; 264/132, 509

(56) References Cited

U.S. PATENT DOCUMENTS

| 5,788,872 | A | * | 8/1998 | Uratani ........................ 249/103 |
| 5,902,512 | A | * | 5/1999 | Streit ........................... 249/103 |
| 6,299,126 | B1 | * | 10/2001 | Hughes, II ................... 249/103 |
| 6,354,560 | B1 | * | 3/2002 | Kawasaki et al. ........... 249/103 |

* cited by examiner

Primary Examiner—James P. Mackey
Assistant Examiner—Donald Heckenberg
(74) Attorney, Agent, or Firm—Epstein Drangel Bazerman & James, LLP

(57) ABSTRACT

A marker having three parts: an annular, enveloping body that is fixed in the location of the mold; and an equally annular intermediate body that is rotatably mounted inside intermediate body and which can rotate relative to the body. Each of these three parts is provided with a signal. Two narrow annular locations are disposed in the area of the marker opposite the operative front, where a helical spring ending in a lug is placed in each of the locations. The lug of the outer spring is the single actuation control of the marker while the lug of the inner spring exhibits play in a small location of the intermediate body. Both springs are oppositely coiled in such a way that strangling of one of the springs takes place simultaneously while the other spring is being released.

1 Claim, 1 Drawing Sheet

MARKER FOR PLASTIC PART FORMING MOULDS

OBJECT OF THE INVENTION

The present invention refers to a marker of the type used in marking plastic parts, during the forming process thereof, in the core of an injection or blowing mould.

The object of the invention is to enhance the marking capacity thereof, specifically to increase the number of variables the marker may mark with maximum operational capacity.

BACKGROUND OF THE INVENTION

When manufacturing a plastic part in a moulding process, it is normal to establish in the same, different types of references of a variable character, like, for example, the part moulding date, specifically determining the month and year when the part was manufactured.

Current markers have a fixed body, conveniently fitted in a mould housing, said fixed body adopting a tubular configuration, such that in the core thereof, there is a mobile nucleus, capable of varying its angular position with respect to the fixed body. In the aforementioned example of practical use, the use of the marker as a date marker, in the front of the fixed body the reliefs or bas-reliefs corresponding to the months of the year are established, in circumferential alignment and in the mobile nucleus, besides establishing a marking arrow for one of said months, the relief or bas-relief corresponding to the year.

This means that each year the marker should be released from the mould, to eliminate the mobile nucleus and replace it by another suitable one for the new year.

DESCRIPTION OF THE INVENTION

The marker proposed by the invention satisfactorily resolves this problem permitting, in the aforementioned case, its use for a long period of time, like for example, ten years, without the need to replace any of the parts.

For this purpose and more specifically, the marker consists of three basic parts, an annular, enveloping body that is fixed in the corresponding location of the mould, an annular rotational and intermediate body and a central core which is also mobile and rotational.

According to this structure and in the aforementioned example of practical embodiment, in the front of the central core, there will be, for example, a signalling arrow, in the front of the annular and rotational body, the months of the year and a second indicating arrow and on the fixed and enveloping body, a series of successive years, such that by the suitable, relative positioning between the three parts integrating the marker, any month of any of the years appearing on the enveloping body may be signalled.

According to another feature of the invention and to facilitate both the stability of the mobile parts in the position selected for them, and to facilitate handling of the marker, it has been foreseen that between the enveloping and intermediate bodies, there is a helicoidal spring and between the intermediate body and the central core, a second helicoidal spring, the first fixed by means of one of its ends to a cover closing the fixed and enveloping body at its end opposite the marker itself, and which constitutes the single activation component of the marker, and the second to the intermediate annular body, with the special feature that said springs have opposite winding directions, such that when they act over the cover-control in a determined rotation direction, one of the springs tends to be strangled over the intermediate body, provoking the dragging thereof, whilst the other one tends to be radially expanded, becoming inoperative with respect to the central core, such that when it acts over said cover-control in an opposite direction, the effect is also opposite, producing the dragging of the central axle or body and maintaining the intermediate rotational body static. Therefore, by means of the rotation of the cover-control in one direction, the signalling of the month is obtained and the signalling of the year is obtained by means of the rotation of the opposite sign.

DESCRIPTION OF THE DRAWINGS

To complete the description being made and to permit a better understanding of the features of the invention according to a preferred example of practical embodiment thereof, said description is accompanied by a set of drawings which show the following with an illustrative and non-limiting character.

PREFERRED EMBODIMENT OF THE INVENTION

Figure 2:
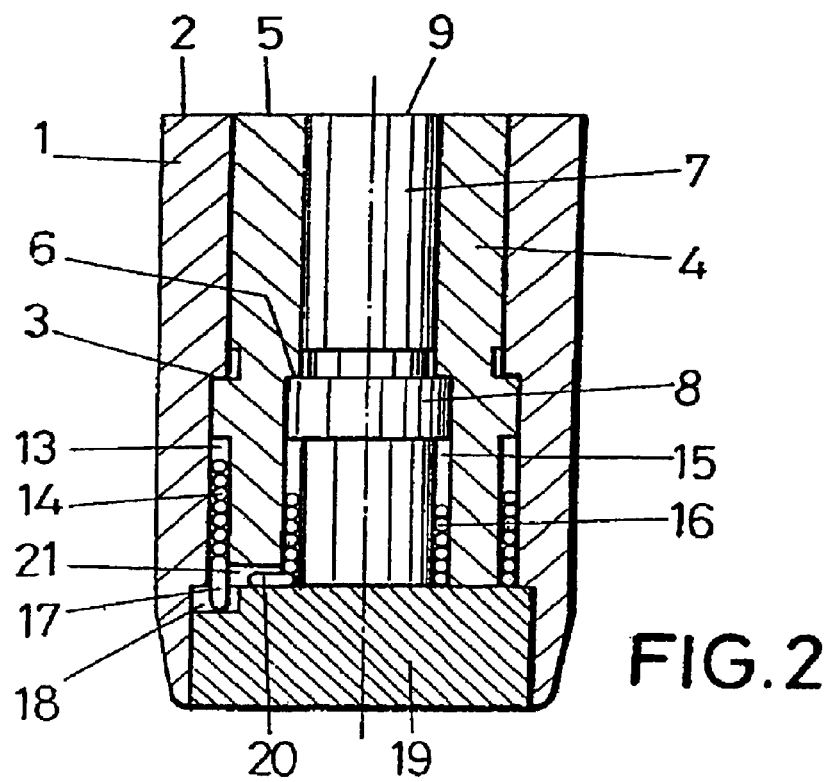
FIG. 2 shows a side elevation view and in diametric section of the same marker.

In the light of the indicated figures and especially in FIG. 2, it may be observed how the marker being described is constituted as from an annular fixed and enveloping body (1), destined to be conveniently inserted in the mould body, so that its front (2) remains levelled with the internal surface thereof, a body provided with an internal and intermediate staging (3) with functions of penetration limiting stops for a second annular body (4), in this case, rotational, whose front (5), in turn remains levelled with the front (2) of the body (1) and which is also provided with perimetric and internal staging (6) with functions of stops for the central axle or core (7), for such a purpose provided with an intermediate expansion (8) and the axle (7) end (9) likewise being coplanar with the fronts (2) and (5) of the annular bodies (1) and (4).

Figure 1:
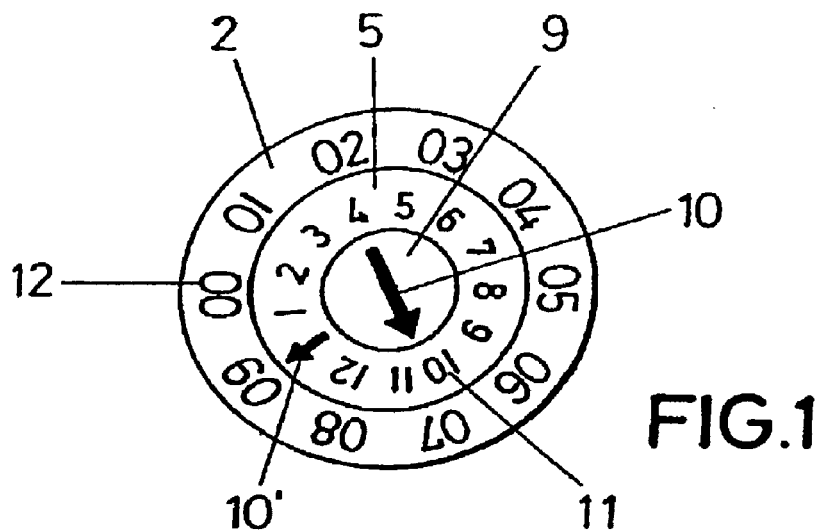
FIG. 1 shows an axial view of a marker for plastic part forming moulds, carried out according to the object of the present invention, according to said example of practical embodiment in which said marker is destined to signal the part manufacturing date.

In the front (6) of the axle (7) there is, for example, a signalling arrow (10), in the front (5) of the annular intermediate body (4), there is signalling (11) corresponding to the months of the year and in front (2) of the fixed body (1) signalling (12) is established corresponding to a series of successive years, like for example, ten years in the example of the practical embodiment of FIG. 1.

As a complement of the structure described between the annular enveloping body (1) and the annular, intermediate, rotating body (4), there is a small chamber (13), also annular, in which a helicoidal spring (14) is housed, while between said annular, intermediate body (4) and the central axle (7) another chamber (15) is defined, in which a second helicoidal spring (16) is housed. The spring (14) is finished in a lug (17) which fits in a housing (18) of a cover (19) which closes below the fixed body (1), while the spring (16) is in turn finished in a lug (20) coupled in the housing (21) of the intermediate body (5), with the special particularity that these springs are coiled in opposite directions, such that rotation in a given direction for the cover (19), in single command functions, provokes the strangling of the spring

(14) against the intermediate body (5) and the resulting fixing between these components, whilst the spring (16) due to its different winding direction, releases the axle (7), whilst when activation is produced in an opposite direction the spring (14) releases the intermediate discoidal body (5), while the spring (16) is strangled over the axle (7), which is blocked, provoking the dragging thereof.

This implies that, with a single command (19), on actuating in a rotation direction, the positional adjustment of the arrow (10) is obtained with respect to the marking (11) and, on actuating over the command (19) in an opposite direction, the marking of the arrow (10) over the signalling (12) is obtained, that is the marking of both the month and year corresponding to the part manufacturing date.

What is claimed is:

1. A marker for plastic part forming molds, the marker designed to be inserted into a mold housing such that the front of the marker is coplanar with the internal surface of the mold, the marker comprising:

a combination of three parts, including an annular enveloping body designed to be statically placed in the mold housing, an intermediate body also annular and designed to be rotatable when placed between the enveloping body and a central axle or body, the central axle or body assembled rotatably inside the intermediate body, each of the three bodies incorporating on the front, a signaling means;

wherein in the marker area opposite the front surface there are two narrow annular housings, one housing between the enveloping and intermediate bodies and the other housing between the intermediate body and the central axle or core, wherein in each of the housing there is a helicoidal spring, the external spring end being finished in a coupling lug to cover closing the fixed and enveloping body and constituting the single actuation command of the marker, while the internal spring is finished in a lug acting in a small housing of the intermediate body;

the springs being coiled in opposite directions, such that the rotation al movement of the command in a determined direction, strangling is produced of one of the springs over one mobile bodies, and the release of the other spring with respect to the other mobile part; and wherein when the command rotates in an opposite direction, likewise an opposite effect occurs, so that the single command permits the central axle or core to be positionally adjusted with respect to the intermediate body, and by means of rotation in opposite direction to positionally adjust the mobile parts with respect to the annular fixed and enveloping bodies.

* * * * *